United States Patent
Hwang et al.

(10) Patent No.: US 8,050,231 B2
(45) Date of Patent: Nov. 1, 2011

(54) APPARATUS AND METHOD FOR DECREASING HANDOVER DELAY IN BROADBAND WIRELESS COMMUNICATION SYSTEM

(75) Inventors: Eui-Seok Hwang, Hwaseong-si (KR); Jeong-Jae Won, Hwaseong-si (KR); Su-Won Lee, Seongnam-si (KR); Xiaoyu Liu, Yongin-si (KR); Young-Seok Kim, Seongnam-si (KR); Jong-Ho Bang, Suwon-si (KR); Jae-Young Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1047 days.

(21) Appl. No.: 11/975,707

(22) Filed: Oct. 19, 2007

(65) Prior Publication Data

US 2008/0130581 A1 Jun. 5, 2008

(30) Foreign Application Priority Data

Oct. 20, 2006 (KR) ........................ 10-2006-0102447

(51) Int. Cl.
*H04W 36/00* (2009.01)
(52) U.S. Cl. ........................................ 370/331; 370/338
(58) Field of Classification Search ........................ None
See application file for complete search history.

(56) References Cited

U.S. PATENT DOCUMENTS

| | | | |
|---|---|---|---|
| 7,826,868 B2 * | 11/2010 | Robbins et al. | 455/560 |
| 2006/0050674 A1 * | 3/2006 | Lee et al. | 370/338 |
| 2006/0193295 A1 * | 8/2006 | White et al. | 370/336 |
| 2006/0246903 A1 * | 11/2006 | Kong et al. | 455/437 |
| 2006/0258355 A1 * | 11/2006 | Olvera-Hernandez et al. | 455/436 |
| 2007/0110075 A1 * | 5/2007 | Olvera-Hernandez | 370/395.52 |
| 2008/0096552 A1 * | 4/2008 | Won et al. | 455/426.1 |
| 2011/0176514 A1 * | 7/2011 | Yoon et al. | 370/331 |

FOREIGN PATENT DOCUMENTS

| | | |
|---|---|---|
| KR | 1020040049125 A | 6/2004 |
| KR | 1020060017429 A | 2/2006 |
| KR | 1020060043314 A | 5/2006 |
| KR | 1020060124397 A | 12/2006 |

\* cited by examiner

*Primary Examiner* — Min Jung

(57) ABSTRACT

Vertical handover apparatus and method in a wireless communication system are provided. The method includes examining whether there exists an accessible target network while communicating with a serving network; when there exists the accessible target network, linking up to the target network; changing a communication state to an idle mode by de-registering the linked target network; and performing a network re-entry to the target network in a vertical handover to the target network. When the terminal can execute the vertical handover without the seamless service support and reduce the handover delay.

20 Claims, 4 Drawing Sheets

APPARATUS AND METHOD FOR DECREASING HANDOVER DELAY IN BROADBAND WIRELESS COMMUNICATION SYSTEM

CROSS-REFERENCE TO RELATED APPLICATION(S) AND CLAIM OF PRIORITY

The present application claims priority under 35 U.S.C. §119 (a) to an application filed in the Korean Intellectual Property Office on Oct. 20, 2006 and assigned Serial No. 2006-0102447, the contents of which are herein incorporated by reference.

TECHNICAL FIELD OF THE INVENTION

The present invention relates generally to an apparatus and method for decreasing a handover delay in a broadband wireless communication system, and in particular, to an apparatus and method for reducing a handover delay during a vertical handover in a broadband wireless communication system which supports multiple networks.

BACKGROUND OF THE INVENTION

With the increasing attention to multimedia service, radio communication system developers are researching a fourth generation (4G) communication system to increase data rates. For example, 4 G communication technology includes the Wireless Local Area Network (WLAN) proposed by the Institute of Electrical and Electronics Engineers (IEEE) 802.11 Working Group and the Wireless Metropolitan Area Network (WMAN) proposed by the IEEE 802.16 Working Group.

WLAN communications use a short range communication technique developed to provide high-speed communication services to stationary users in a crowded, limited area, such as indoors and downtown, by extending the wired LAN based on the IEEE-802.11 standard. A network which supports the WLAN communications (hereafter, referred to as a WLAN network) supports the users in a service coverage area with tens of Mbps to hundreds of Mbps. However, a WLAN network has narrow service coverage and does not guarantee the mobility of the user.

The WMAN communication technique supports data service based on the IEEE-802.16 standard when users are stationary, walking, or moving at a medium speed (60 km/h at maximum). A network supporting WMAN communications (hereafter, referred to as a WMAN network) supports average data rates of tens of Mbps.

While a WMAN network has wide service coverage and supports user mobility compared to a WLAN network, a WMAN network suffers a low data rate. In contrast, a WLAN network provides a faster data rate than a WMAN network but has narrow service coverage and does not guarantee user mobility. As such, since the multiple networks supported by the broadband wireless communication system have different advantages and disadvantages, service is provided to the user over the corresponding network according to the user's intended service type.

Therefore, to select the network according to the user's intended service type and provide the service to the user, a broadband wireless communication system requires smooth interworkings between networks. That is, the broadband wireless communication system should support a handover between heterogeneous networks or media.

SUMMARY OF THE INVENTION

To address the above-discussed deficiencies of the prior art, it is a primary object to substantially solve at least the above problems and/or disadvantages and to provide at least the advantages below. Accordingly, an aspect of the present invention is to provide a vertical handover apparatus and method using a Media Independent Handover (MIH) technique in a broadband wireless communication system supporting multiple networks.

Another aspect of the present invention is to provide an apparatus and method for decreasing a handover delay in an entry process to a target network when a vertical handover is executed in a broadband wireless communication system supporting multiple networks.

A further aspect of the present invention is to provide an apparatus and method for decreasing a handover delay when a vertical handover is executed to an Orthogonal Frequency Division Multiple Access (OFDMA) broadband mobile communication network (e.g., IEEE 802.16 system) in a broadband wireless communication system supporting multiple networks.

The above aspects are achieved by providing a vertical handover method in a wireless communication system, which includes examining whether there exists an accessible target network while communicating with a serving network; when there exists the accessible target network, linking up to the target network; changing a communication state to an idle mode by de-registering the linked target network; and performing a network re-entry to the target network in a vertical handover to the target network.

According to one aspect of the present invention, a vertical handover method between a Wireless Local Area Network (WLAN) and an orthogonal Frequency Division Multiple Access (OFDMA) broadband mobile communication network in a wireless communication system, includes examining whether there exists an accessible broadband mobile communication network while communicating with the WLAN; when there exists the accessible broadband mobile communication network, linking up to the broadband mobile communication network; changing a communication state to an idle mode by de-registering the linked broadband mobile communication network; and performing a network re-entry to the broadband mobile communication network in the handover to the broadband mobile communication network.

According to another aspect of the present invention, a terminal of a wireless communication system which supports multiple networks includes at least two Media Access Control (MAC) layer parts for communicating with at least two different networks; and a handover control module for controlling the MAC layer parts to link up to an accessible target network, to change a communication state to an idle mode, and to perform a network re-entry procedure to the target network in a vertical handover.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE PRESENT INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged.

The present invention provides a technique for decreasing a handover delay when a vertical handover is performed in a broadband wireless communication system supporting multiple networks. The handover delay, which is caused by an initial network entry to a target network during the vertical handover, signifies the service interruption.

The broadband wireless communication system executes the vertical handover using a Media Independent Handover (MIH) technique. The MIH technique is the interworking technique being standardized by IEEE-802.21 Working Group. The MIH technique provides event service, command service, and information service so that a terminal can execute the seamless handover between heterogeneous networks or media in the broadband wireless communication system supporting the multiple networks.

In the following description, it is assumed that the broadband wireless communication system supports a Wireless Local Area Network (WLAN) and an Orthogonal Frequency Division Multiple Access (OFDMA) broadband mobile communication network (e.g., IEEE 802.16 system). The vertical handover from the WLAN to the broadband mobile communication network is explained by way of example. When the broadband wireless communication system supports other networks, the present invention is applicable to the vertical handover between the other networks.

Figure 1:
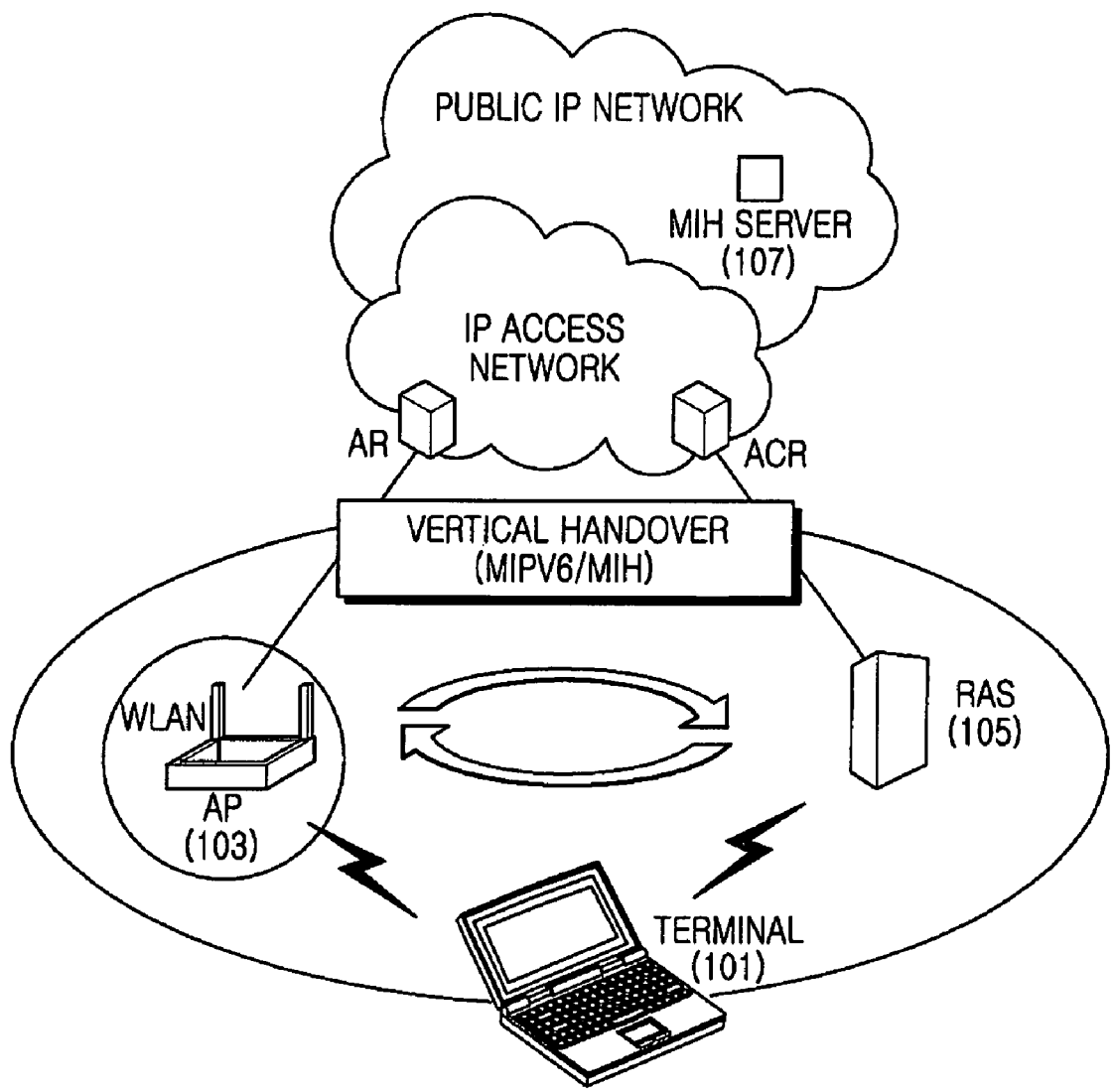
FIG. 1 illustrates a broadband wireless communication system using a MIH technique according to the present invention.

FIG. 1 illustrates a vertical handover in a general broadband wireless communication system.

The broadband wireless communication system of FIG. 1 supports a WLAN network 103 and a broadband mobile communication network 105. A terminal 101 in the broadband wireless communication system can be serviced by the WLAN network 103 or the broadband mobile communication network 105. The terminal 101 can execute a vertical handover by acquiring information of neighbor networks from a MIH server 107. The MIH server 107 stores the information of the neighbor networks other than the network currently in communication with the terminal 101, and transmits the neighbor network information to the terminal 101.

As above, the broadband wireless communication system supporting the multiple networks supports the vertical handover using the MIH technique. For doing so, the terminal 101 needs to include multiple wireless interfaces to support the multiple networks as shown in FIG. 2.

Figure 2:
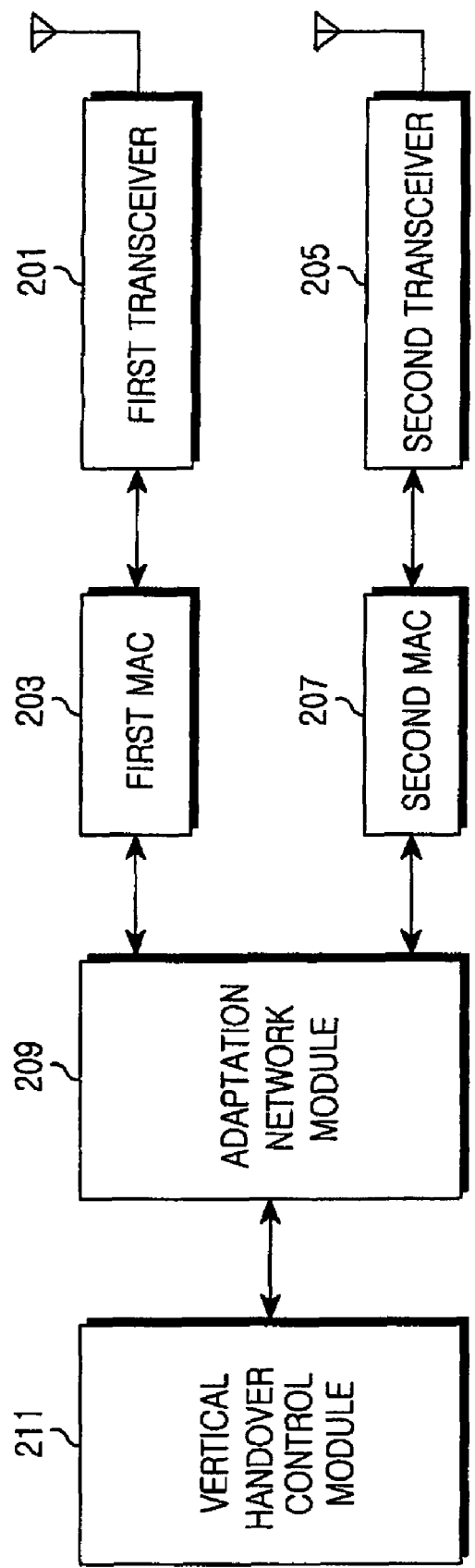
FIG. 2 is a block diagram of a terminal for a vertical handover according to the present invention.

FIG. 2 is a block diagram of the terminal 101 for the vertical handover according to the present invention.

The terminal 101 of FIG. 2 includes a first transceiver 201, a first Media Access Control (MAC) 203, a second transceiver 205, a second MAC 207, an adaptation network module 209, and a vertical handover control module 211.

The first transceiver 201 processes Radio Frequency (RF) signals transmitted and received over the WLAN network. The first MAC 203 processes the RF signal fed from the first transceiver 201 by converting to a baseband signal. The first transceiver 201 and the first MAC 203 are deactivated when the terminal 101 communicates using the second transceiver 205 and the second MAC 207 over the broadband mobile communication network. Yet, while the terminal 101 communicates over the broadband mobile communication network, if there is an accessible WLAN network, the first transceiver 201 and the first MAC 203 establish the link to the WLAN network and change to an idle mode under the control of the vertical handover control module 211.

The second transceiver 205 processes RF signals transmitted and received over the broadband mobile communication network. The second MAC 207 processes the RF signal fed from the second transceiver 205 by converting to a baseband signal. The second transceiver 205 and the second MAC 207 are deactivated when the terminal 101 communicates over the WLAN network using the first transceiver 201 and the first MAC 203. While the terminal 101 communicates over the WLAN network, if there is an accessible broadband mobile communication network, the second transceiver 205 and the second MAC 207 establish the link to the broadband mobile communication network and change to an idle mode under the control of the vertical handover control module 211.

A media dependent service access point interposes between the adaptation network module 209 and the MACs 203 and 207. The media dependent service access point uses a signal defined according to the MAC type. For example, a signal defined in MLME SAP of IEEE 802.11 is used between the WLAN MAC 203 and the adaptation network module 209. A signal defined in C_SAP Primitives of IEEE 802.16g is used between the broadband mobile communication network MAC 207 and the adaptation network module 209.

Hence, the adaptation network module 209 converts the signal of the different types fed from the MACs 203 and 207 and sends the converted signal to the vertical handover control module 211 so that the vertical handover control module 211 can process the signal regardless of the MAC type.

The adaptation network module 209 converts the signal fed from the vertical handover control module 211 according to the MAC type and sends the converted signal to the corresponding MAC. Herein, the adaptation network module 209 indicates a MIH part which executes the MIH function.

The vertical handover control module 211 controls the vertical handover of the terminal 101 according to the signal fed from the adaptation network module 209. In the communications with the WLAN, the vertical handover control module 211 sets the communication state with the accessible broadband mobile communication network to the idle mode.

Accordingly, when vertically handing over to the broadband mobile communication network, the terminal 101 can reduce the handover delay by performing a network re-entry procedure rather than the network entry procedure. Herein, the idle mode signifies that the terminal 101 periodically receives broadcast signals of Radio Access Stations (RASs) without the registration procedure to a specific RAS in the broadband mobile communication network.

Now, the vertical handover of the terminal 101 using the MIH technique in the broadband wireless communication system is explained. The terminal 101 keeps the idle mode with the accessible target network while being serviced from the serving network. In the handover, the terminal 101 can reduce the handover delay by performing the network re-entry procedure rather than the network entry procedure.

Figure 3:
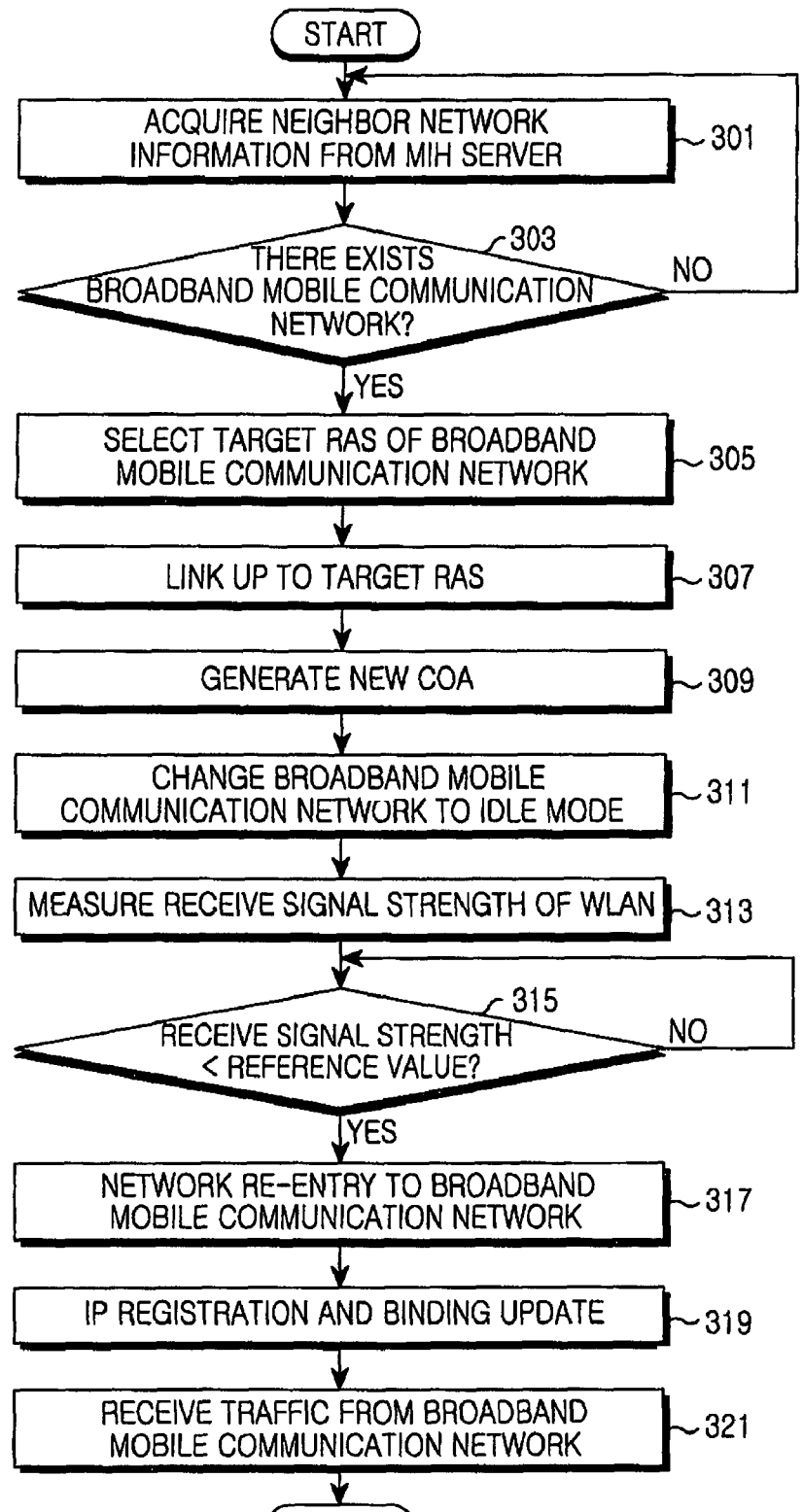
FIG. 3 is a flowchart of the vertical handover operations of the terminal according to the present invention.

FIG. 3 is a flowchart of the vertical handover operations of the terminal 101 according to the present invention. It is assumed that the terminal 101 serviced from the WLAN performs the vertical handover to the neighbor broadband mobile communication network.

In FIG. 3, the terminal 101 serviced over the WLAN network periodically acquires information of neighbor networks from the MIH server in step 301. At this time, it is assumed that the terminal 101 is not linked to the broadband mobile communication network. That is, the second transceiver 205 and the second MAC 207 of the terminal 101 for the communications with the broadband mobile communication network are inactive.

After acquiring the information of the neighbor networks, the terminal 101 determines whether there is an accessible broadband mobile communication network based on the information of the neighbor networks in step 303.

When there is the accessible broadband mobile communication network, the terminal 101 collects control information of the accessible broadband mobile communication network through the scanning in step 305. The terminal 101 scans by activating the second transceiver 205 and the second MAC 207.

Next, the terminal 101 selects a target RAS for the handover based on the collected control information.

After selecting the target RAS, the terminal 101 links up to the target RAS in step 307. In more detail, the terminal 101 links up to the target RAS by activating the second transceiver 205 and the second MAC 207 for the communications with the broadband mobile communication network. For instance, the terminal 101 performs the ranging procedure, the service basic capability procedure, and the registration procedure with the target RAS by activating the second transceiver 205 and the second MAC 207.

After linking up to the target RAS, the terminal 101 receives a new Care of Address (CoA) for the communications with the target RAS by performing a Dynamic Host Configuration Protocol (DHCP) in step 309.

After receiving the new CoA, the terminal 101 changes the communication state with the broadband mobile communication network to the idle mode by de-registering the target RAS in step 311. The terminal 101 is serviced over the WLAN while the terminal 101 links up to the broadband mobile communication network and changes to the idle mode. The idle mode signifies that the terminal 101 periodically receives the broadcast signals of the RASs without performing the registration procedure to a specific RAS of the broadband mobile communication network.

In step 313, the terminal 101 measures a strength of the signal received from the WLAN network.

After measuring the receive signal strength, the terminal 101 determines whether it gets out of the service coverage of the WLAN network by comparing the receive signal strength with a preset reference value in step 315.

When the receive signal strength is less than the reference value, the terminal 101 performs the network re-entry procedure to the broadband mobile communication network operating in the idle mode in step 317. For example, when the receive signal strength is less than the reference value, the terminal 101 determines that it is out of the service coverage of the WLAN network, and accordingly performs the ranging procedure to the target RAS of the broadband mobile communication network.

In step 319, the terminal 101 executes the IP registration and the binding update to the target RAS.

After the IP registration and the binding update, the terminal 101 receives traffic from the target RAS in step 321. In doing so, the terminal 101 disconnects the link with the WLAN.

Next, the terminal 101 finishes this process.

Figure 4:
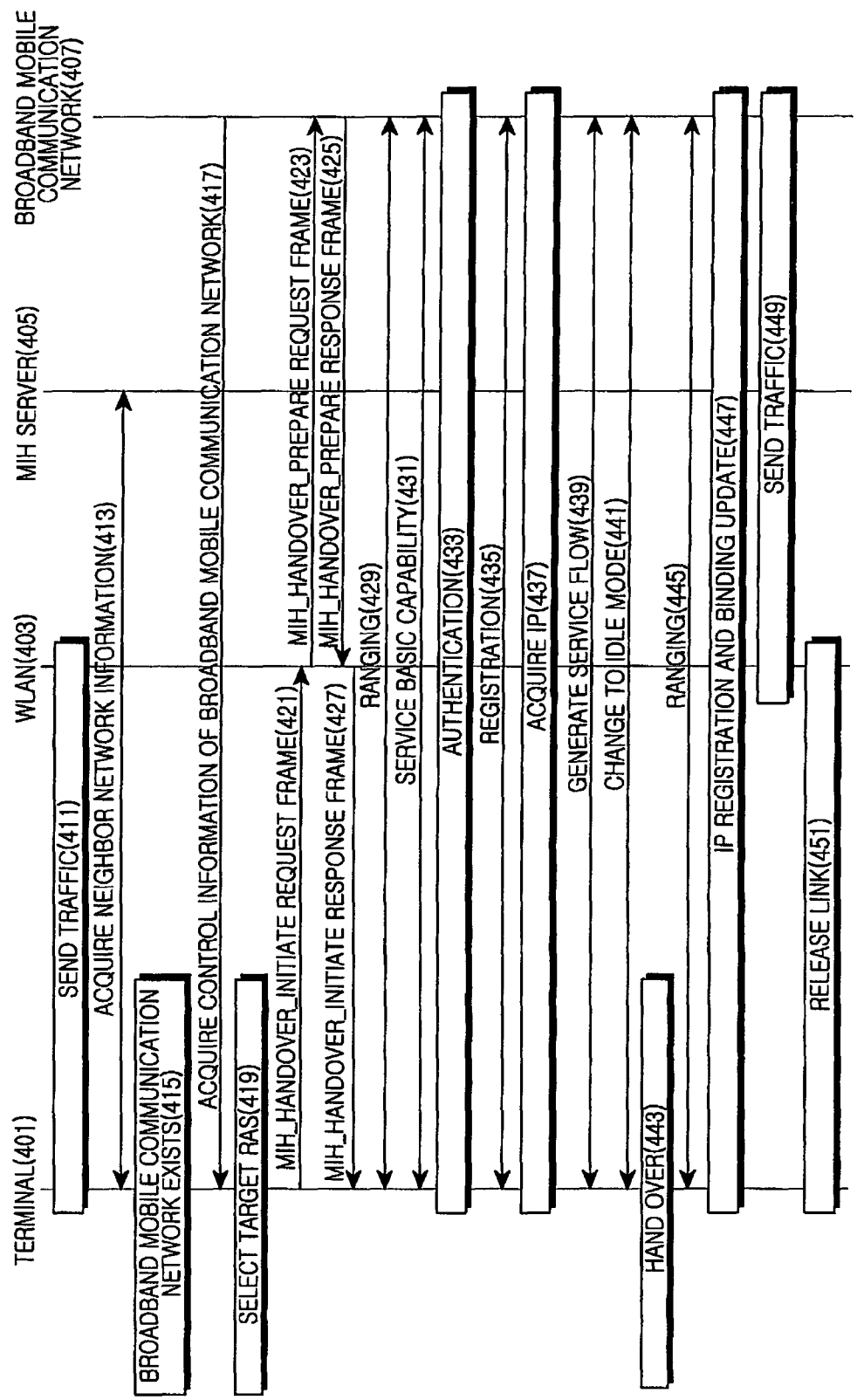
FIG. 4 illustrates the vertical handover procedure from a WLAN network to a broadband mobile communication network according to the present invention.

FIG. 4 illustrates the vertical handover procedure from the WLAN network 403 to the broadband mobile communication network 407 according to the present invention.

The terminal 401 in FIG. 4 is serviced over the WLAN 403 in step 411. In doing so, it is assumed that the terminal 401 is not linked up to the broadband mobile communication network 407.

The terminal 401 periodically acquires information of neighbor networks from the MIH server 405 in step 413. For example, to acquire the information of the neighbor networks, the terminal 401 sends MIH_Get_information REQUEST FRAME to the MIH server 405. The MIH server 405 sends MIH_Get_information RESPONSE FRAME including the information of the neighbor networks to the terminal 401 in reply to the MIH_Get_information REQUEST FRAME.

In step 415, the terminal 401 examines whether there exists an accessible broadband mobile communication network using the acquired neighbor network information. When there exists the accessible broadband mobile communication network 407, the terminal 401 collects control signals broadcast over the neighbor broadband mobile communication network 407 through the scanning in step 417. For the scanning, the terminal 401 activates the second transceiver 205 and the second MAC 207. The broadcast control signals include downlink MAP, uplink MAP, Downlink Channel Descriptor (DCD), and Uplink Channel Descriptor (UCD).

Upon collecting the control signals of the neighbor broadband mobile communication network 407, the terminal 401 determines a target RAS for the handover using the control signals in step 419.

After selecting the target RAS, the terminal sends MIH_Handover_Initiate REQUEST FRAME to the WLAN 403 which is the serving station in step 421.

Upon receiving the MIH_Handover_Initiate REQUEST FRAME, the WLAN 403 confirms the target RAS for the handover of the terminal 401. In step 423, the WLAN 403 sends MIH_Handover_Prepare REQUEST FRAME to the broadband mobile communication network 407 of the target RAS.

Upon receiving the MIH_Handover_Prepare REQUEST FRAME, the broadband mobile communication network 407 determines whether the handover of the terminal 401 is supportable according to the load. In steps 425 and 427, the broadband mobile communication network 407 informs the terminal 401 of the handover supportability over the WLAN 403. For example, the broadband mobile communication network 407 sends a MIH_Handover_Prepare RESPONSE FRAME to the WLAN 403 in step 425. Next, the WLAN 403, receiving the MIH_Handover_Prepare RESPONSE FRAME, sends a MIH_Handover_Initiate RESPONSE FRAME to the terminal 401 in step 427.

Receiving the MIH_Handover_Initiate RESPONSE FRAME from the WLAN 403, the terminal 401 examines whether the handover to the broadband mobile communication network 407 is possible based on the frame. That is, the terminal 401 examines whether the broadband mobile communication network 407 supports the handover of the terminal 401 based on the MIH_Handover Initiate RESPONSE FRAME.

When the handover to the broadband mobile communication network 407 is possible, the terminal 401 links up to the broadband mobile communication network 407 in steps 429 through 435. In detail, the terminal 401 performs the ranging procedure, the service basic capability procedure, the authentication procedure, and the registration procedure with the broadband mobile communication network 407.

After linking up to the broadband mobile communication network 407, the terminal 401 acquires an IP address from the DHCP server using the DHCP for the communications with the broadband mobile communication network 407 in step 437.

After acquiring the IP address, the terminal 401 generates a service flow with the broadband mobile communication network 407 in step 439.

Upon generating the service flow, the terminal 401 transits to the idle mode by de-registering the broadband mobile communication network 407 in step 441. The idle mode signifies that the terminal 401 periodically receives the broadcast signals of the RASs of the broadband mobile communication network 407 without the registration to a specific RAS of the broadband mobile communication network 407.

During the above procedures, the terminal 401 is serviced by the WLAN 403.

Next, the terminal 401 determines whether to hand over by measuring the strength of the signal received from the WLAN 403 in step 443. In other words, the terminal 401 determines whether it gets out of the service coverage of the WLAN 403 by comparing the receive signal strength with a preset reference value.

When the receive signal strength is less than the reference value, the terminal 401 determines that it gets out of the service coverage of the WLAN 403 and thus determines the handover.

Upon determining the handover, the terminal 401 performs the network re-entry procedure to the broadband mobile communication network 407 which operates in the idle mode in step 445. For example, the terminal 401 performs the ranging procedure to the broadband mobile communication network 407.

In step 447, the terminal 401 performs the registration and the binding update of the acquired IP to the broadband mobile communication network 407.

After the binding update, the terminal 401 receives the traffic from the broadband mobile communication network 407 in step 449.

Receiving the traffic from the broadband mobile communication network 407, the terminal 401 releases the communication link of the WLAN 403 in step 451.

As set forth above, when the broadband mobile communication system supporting the multiple networks supports the vertical handover using the MIH technique, the link to the target network is established prior to the handover. Since the terminal performs the network re-entry to the target network for the vertical handover, the seamless vertical handover of the terminal is achieved without service interruption and the handover delay can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A vertical handover method in a wireless communication system, the method comprising:
   determining whether an accessible target network exists while communicating with a serving network;
   when the accessible target network exists, linking up to the target network during an initial network entry to the target network while being serviced by the serving network;
   changing a communication state with the target network to an idle mode by de-registering the linked target network while being serviced by the serving network; and
   performing a network re-entry to the target network in a vertical handover to the target network.

2. The vertical handover method of claim 1, wherein the determining whether there exists the accessible target network exists comprises:
   acquiring information of neighbor networks from a Media Independent Handover (MIH) server; and
   determining whether there exists an accessible target network based on the information of the neighbor networks.

3. The vertical handover method of claim 1, wherein the linking up comprises:
   selecting a target Base Station (BS) by collecting information regarding the accessible target network; and
   linking up to the target BS.

4. The vertical handover method of claim 1, further comprising:
   after changing the communication state of the target network to the idle mode, determining whether to vertically hand over,
   wherein, upon determining to vertically hand over to the target network, the network re-entry to the target network is performed.

5. The vertical handover method of claim 4, wherein the determining whether to vertically hand over comprises:
   measuring a strength of a signal received from the serving network;
   comparing the strength of the received signal with a reference value; and
   performing the vertical handover when the strength of the received signal is less than the reference value.

6. A vertical handover method between a Wireless Local Area Network (WLAN) and an orthogonal Frequency Division Multiple Access (OFDMA) broadband mobile communication network in a wireless communication system, the method comprising:
   determining whether an accessible broadband mobile communication network while communicating with the WLAN;
   when the accessible broadband mobile communication network exists, linking up to the broadband mobile communication network during an initial network entry to the broadband mobile communication network while being serviced by the WLAN;
   changing a communication state with the broadband communication network to an idle mode by de-registering the linked broadband mobile communication network while being serviced by the WLAN; and
   performing a network re-entry to the broadband mobile communication network in the handover to the broadband mobile communication network.

7. The vertical handover method of claim 6, wherein determining whether the accessible broadband mobile communication network exists comprises:
- acquiring information of neighbor networks from a Media Independent Handover (MIH) server; and
- determining whether an accessible broadband mobile communication network exists based on the information of the neighbor networks.

8. The vertical handover method of claim 6, wherein linking up comprises:
- selecting a target Radio Access Station (RAS) by collecting information of the accessible broadband mobile communication network; and
- linking up to the target RAS.

9. The vertical handover method of claim 8, wherein linking up to the target RAS comprises:
- performing a ranging procedure, a service basic capability procedure, an authentication procedure, and a registration procedure to the target RAS.

10. The vertical handover method of claim 6, further comprising:
- after changing the communication state of the broadband mobile communication network to the idle mode, determining whether to vertically hand over,
- wherein, upon determining to vertically hand over to the broadband mobile communication network, the network re-entry to the broadband mobile communication network is performed.

11. The vertical handover method of claim 10, wherein the determining whether to vertically hand over comprises:
- measuring a strength of a signal received from the WLAN;
- comparing the strength of the received signal with a reference value; and
- determining to vertically hand over when the strength of the received signal is less than the reference value.

12. The vertical handover method of claim 6, wherein the network re-entry procedure performs a ranging procedure to the broadband mobile communication network which operates in the idle mode.

13. A terminal of a wireless communication system which supports multiple networks, the terminal comprising:
- at least two Media Access Control (MAC) layer parts for communicating with at least two different networks; and
- a handover control module for controlling the MAC layer parts to link up to an accessible target network during an initial network entry to the target network while being serviced by a serving network, to change a communication state with the target network to an idle mode by de-registering the linked target network while being serviced by the serving network, and to perform a network re-entry procedure to the target network in a vertical handover.

14. The terminal of claim 13, wherein a one of the MAC layer parts is deactivated when the terminal communicates over a second network different from a first network managed by the one MAC layer part, and when the terminal is accessible to the first network while communicating with the second network, the one MAC layer part is activated under control of the handover control module to link up to the first network, and the one MAC layer part operates in an idle mode.

15. The terminal of claim 13, further comprising:
- a Media Independent Handover (MIH) part interposed between the handover control module and the MAC layer parts and configured to convert a signal provided from one of the MAC layer parts to a prescribed format so that the handover control module processes the signal independently of media.

16. The terminal of claim 15, wherein the MIH part is configured to convert a signal fed from the handover control module to a prescribed format of each of the MAC layer parts and send the converted signal to each of the MAC layer parts respectively.

17. A vertical handover apparatus between a Wireless Local Area Network (WLAN) and an orthogonal Frequency Division Multiple Access (OFDMA) broadband mobile communication network in a wireless communication system, the apparatus comprising:
- a handover control module configured to:
- determine whether an accessible broadband mobile communication network exists while communicating with the WLAN;
- when the accessible broadband mobile communication network exists, link up to the broadband mobile communication network during an initial network entry to the broadband mobile communication network while being serviced by the WLAN;
- change a communication state with the broadband mobile communication network to an idle mode by de-registering the linked broadband mobile communication network while being serviced by the WLAN; and
- perform a network re-entry procedure to the broadband mobile communication network to hand over to the broadband mobile communication network.

18. The vertical handover apparatus of claim 17, wherein the handover control module determines whether the accessible broadband mobile communication network exists by:
- acquiring information of neighbor networks from a Media Independent Handover (MIH) server; and
- determining whether there exists an accessible broadband mobile communication network based on the information of the neighbor networks.

19. The vertical handover apparatus of claim 17, wherein the handover control module links up by:
- performing a ranging procedure, a service basic capability procedure, an authentication procedure, and a registration procedure with a target Radio Access Station (RAS).

20. The vertical handover apparatus of claim 17, wherein the handover control module performs the network re-entry procedure by performing a ranging procedure to a broadband mobile communication network which operates in the idle mode.

* * * * *